3,096,252
PROCESS FOR PRODUCING L-GLUTAMIC ACID

Shinichi Motozaki, Tokyo, Toshinao Tsunoda and Shinji Okumura, Kanagawa-ken, Ryuichiro Tsugawa, Tokyo, Toshinori Matsui, Kumamoto-ken, and Atsuo Kitai and Noboru Miyachi, Tokyo, Japan, assignors to Ajinomoto Kabushiki Kaisha and Sanraku Shuzo Kabushiki Kaisha, both of Tokyo, Japan, and both corporations of Japan No Drawing. Filed Apr. 19, 1961, Ser. No. 104,010
Claims priority, application Japan Apr. 23, 1960
13 Claims. (Cl. 195—47)

This invention relates to processes for producing L-glutamic acid, and more particularly to novel processes for producing the same by fermentation techniques using bacteria.

Various methods are known for producing L-glutamic acid by fermentation techniques employing L-glutamic-acid producing bacteria. For example, methods are known for producing L-glutamic-acid by culturing bacteria under aerobic conditions in a culture medium containing carbohydrates such as glucose, fructose, sucrose, maltose, starch hydrolysates or the like and nitrogen sources such as inorganic or organic ammonium salts, urea, ammonia solution, ammonia gas or the like as the primary components, and also a small amount of amino acids, vitamin $B_1$ and inorganic salts such as potassium phosphates, magnesium sulphate, iron and manganese ions and the like. In these conventional methods, however, the rate of growth of the fermentation bacteria is poor and the fermentation efficiency, i.e. the amount of L-glutamic acid produced per hour, is very low. Therefore, those conventional methods are uneconomical and unsuitable for producing L-glutamic-acid on a large scale. This is due to the poor growth of fermentation bacteria caused by a lack of nutrients required for their growth.

It is an object of this invention to provide an improved process for producing L-glutamic acid wherein the amount of L-glutamic acid produced and accumulated in a culture medium is unexpectedly increased. It is another object of this invention to provide a process for producing L-glutamic acid efficiently and on an industrial scale. Other objects and advantages of this invention will be apparent from the following detailed description thereof.

It has now been discovered that L-glutamic acid can be efficiently produced with a high yield in a short time by culturing L-glutamic acid producing bacteria under aerobic conditions in the presence of at least one member selected from the group consisting of desthiobiotin, biotin-d-sulfoxide, and biocytin in a culture medium such as described above for L-glutamic acid fermentation. In accordance with this invention, L-glutamic acid is produced by culturing L-glutamic acid producing bacteria belonging to the genus Brevibacterium under aerobic conditions in a culture medium containing at least one member selected from the group consisting of desthiobiotin (5-methyl-2-oxo-4-imidazolidine caproic acid) having the formula

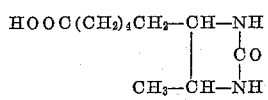

biotin-d-sulfoxide having the formula

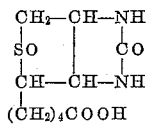

and biocytin having the formula

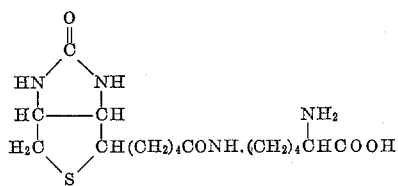

along with carbohydrates, nitrogen sources and inorganic salts as the primary components.

In processes of this invention, the rate of growth of fermentation bacteria is accelerated, and the amount of L-glutamic acid produced and accumulated is remarkably increased.

As noted, although there exist lots of prior arts pertaining to L-glutamic-acid-fermentation using bacteria, no prior art reporting that the efficiency and yield of L-glutamic acid fermentation are outstandingly increased by culturing said bacteria in a culture medium containing at least one member from the group including desthiobiotin, biotin-d-sulfoxide and biocytin is known.

In case of fermentation using various strains belonging to the genus Brevibacterium capable of producing L-glutamic acid, the influence of the addition of desthiobiotin, biotin-d-sulfoxide and biocytin on the rate of fermentation and the amount of L-glutamic acid produced are given in the following tables.

TABLE I

| | Bacterium used | | | | | | | | | | | | | | |
|---|---|---|---|---|---|---|---|---|---|---|---|---|---|---|---|
| | Brevibacterium lactofermentum, ATCC No. 13869 | | | Brevibacterium saccharolyticum, ATCC No. 14066 | | | Brevibacterium flavum, ATCC No. 14067 | | | Brevibacterium immariophilium, ATCC No. 14068 | | | Brevibacterium roseum, ATCC No. 13825 | | |
| dl-Desthiobiotin ($\gamma$/l.) | Analysis | | | | | | | | | | | | | | |
| | Growth | Residual sugar, percent | Amount of L-glutamic acid produced, percent | Growth | Residual sugar, percent | Amount of L-glutamic acid produced, percent | Growth | Residual sugar, percent | Amount of L-glutamic acid produced, percent | Growth | Residual sugar, percent | Amount of L-glutamic acid produced, percent | Growth | Residual sugar, percent | Amount of L-glutamic acid produced, percent |
| 0 | 0.11 | 85.3 | 6.3 | 0 | 92.5 | 0.7 | 0.14 | 83.2 | 4.3 | 0.18 | 78.2 | 2.9 | 0.15 | 80.8 | 3.9 |
| 6 | 0.59 | 31.9 | 30.4 | 0.46 | 36.4 | 21.2 | | | | | | | | | |
| 8 | 0.70 | 17.2 | 37.6 | 0.65 | 10.2 | 36.0 | 0.52 | 25.8 | 39.5 | 0.52 | 38.2 | 17.0 | 0.50 | 34.4 | 32.0 |
| 10 | | | | | | | 0.60 | 7.1 | 49.2 | 0.60 | 4.5 | 29.1 | 0.73 | 1.9 | 49.8 |
| 12 | 0.80 | 5.9 | 42.5 | 0.68 | 26.0 | 44.7 | 0.65 | 0.6 | 44.7 | 0.65 | 1.5 | 27.4 | 0.78 | 0.8 | 39.8 |
| 16 | 0.92 | 5.4 | 38.5 | | | | | | | | | | | | |

All of experiments described in Table I excluding experiments using *Brevibacterium lactofermentum* ATCC No. 13869 were carried out at a temperature of 30° C. for 40 hours under shaken culture in the culture medium consisting of the following ingredients:

| | |
|---|---|
| Glucose _____ percent__ | 10.4 |
| KH$_2$PO$_4$ _____ do____ | 0.1 |
| MgSO$_4$·7H$_2$O _____ do____ | 0.04 |
| Fe$^{++}$ _____ p.p.m__ | 2 |
| Mn$^{++}$ _____ p.p.m__ | 2 |
| Hydrolysate of soybean protein (total nitrogen 2.4 g./dl.) _____ ml./dl__ | 0.1 |
| Vitamin B$_1$ hydrochloride_____ γ/l__ | 200 |
| Urea _____ percent__ | 1.8–3.6 |

In case of *Brevibacterium lactofermentum* ATCC No. 13869, 50 γ/l. of vitamin B$_1$ hydrochloride and 0.9–3.2% of urea were used.

It is apparent from the above tables that the fermentation of any strain belonging to the genus Brevibacterium proceeds inefficiently, that the rate of growth of the fermentation bacteria is poor, and that a large amount of residual sugar is left in the medium and therefore the yield of L-glutamic acid is as low as 10%, in the absence of desthiobiotin, biotin-d-sulfoxide or biocytin.

On the contrary, it is seen that in case of the presence of at least one of said compounds, active fermentation, i.e., an increased rate of growth of fermentation bacteria, and substantial consumption of the saccharide is effected, the amount of L-glutamic acid produced, i.e., the concentration thereof, substantially exceeds 4.0 g./dl. and a yield of L-glutamic acid as high as about 50% can be obtained. Thus, the addition of desthiobiotin, biotin-d-sulfoxide or biocytin has an obviously remarkable effect.

In case desthiobiotin, biocytin or biotin-d-sulfoxide

TABLE II

| | Bacterium used | | | | | | | | | | | |
|---|---|---|---|---|---|---|---|---|---|---|---|---|
| | *Brevibacterium lactofermentum*, ATCC No. 13869 | | | *Brevibacterium saccharolyticum*, ATCC No. 14066 | | | *Brevibacterium flavum*, ATCC No. 14067 | | | *Brevibacterium roseum*, ATCC No. 13825 | | |
| Biotin-d-sulfoxide (γ/l.) | Analysis | | | | | | | | | | | |
| | Growth | Residual sugar, percent | Amount of L-glutamic acid, produced, percent | Growth | Residual sugar, percent | Amount of L-glutamic acid produced, percent | Growth | Residual sugar, percent | Amount of L-glutamic acid produced, percent | Growth | Residual sugar, percent | Amount of L-glutamic acid produced, percent |
| 0 | 0.10 | 76.8 | 13.4 | 0.00 | 92.5 | 0.7 | 0.14 | 83.2 | 7.6 | 0.15 | 80.8 | 10.1 |
| 2 | 0.34 | 48.0 | 21.7 | 0.24 | 20.3 | 15.0 | | | | 0.37 | 46.2 | 25.0 |
| 4 | 0.45 | 22.7 | 36.9 | | | | | | | | | |
| 5 | | | | | | | | | | 0.80 | 2.0 | 46.3 |
| 6 | | | | | | | 0.68 | 0.7 | 50.1 | | | |
| 8 | 0.67 | 1.3 | 45.1 | | | | | | | | | |
| 12 | | | | 0.70 | 0.4 | 40.1 | | | | | | |

| | Bacterium used | | | | | | | | | | | |
|---|---|---|---|---|---|---|---|---|---|---|---|---|
| | *Brevibacterium lactofermentum*, ATCC No. 13869 | | | *Brevibacterium saccharolyticum*, ATCC No. 14066 | | | *Brevibacterium flavum*, ATCC No. 14067 | | | *Brevibacterium roseum*, ATCC No. 13825 | | |
| Biocytin (γ/l.) | Analysis | | | | | | | | | | | |
| | Growth | Residual sugar, percent | Amount of L-glutamic acid, produced, percent | Growth | Residual sugar, percent | Amount of L-glutamic acid produced, percent | Growth | Residual sugar, percent | Amount of L-glutamic acid produced, percent | Growth | Residual sugar, percent | Amount of L-glutamic acid produced, percent |
| 0 | 0.10 | 78.6 | 11.1 | 0.00 | 92.5 | 0.7 | 0.14 | 83.2 | 7.6 | 0.15 | 80.8 | 10.1 |
| 2 | 0.31 | 49.8 | 19.6 | | | | | | | | | |
| 3 | 0.43 | 31.3 | 27.3 | | | | | | | | | |
| 4 | | | | | | | 0.44 | 37.2 | 38.2 | 0.51 | 24.9 | 39.2 |
| 6 | 0.59 | 4.8 | 41.9 | 0.33 | 18.8 | 16.3 | | | | 0.73 | 2.0 | 47.7 |
| 8 | | | | | | | 0.66 | 1.0 | 47.3 | | | |
| 16 | | | | 0.70 | 0.4 | 34.7 | | | | | | |

All of the experiments described in Table II were carried out at a temperature of 31° C. for 40 hours, the culture medium being shaken and consisting of the following ingredients:

| | |
|---|---|
| Glucose _____ percent__ | 10 |
| KH$_2$PO$_4$ _____ do____ | 0.1 |
| MgSO$_4$.7H$_2$O _____ do____ | 0.04 |
| Fe$^{++}$ _____ p.p.m__ | 2 |
| Mn$^{++}$ _____ p.p.m__ | 2 |
| Hydrolysate of soybean protein (total nitrogen 2.4 g./dl.) _____ ml./dl__ | 0.1 |
| Vitamin B$_1$ hydrochloride_____ γ/l__ | 200 |
| Urea _____ percent__ | 0.9–3.2 |

In the above tables, "Growth" represents degree of turbidity in the culture medium diluted 26 times at 562 mμ, and percentages of "Residual sugar" and "Amount of L-glutamic acid produced" are the basis of the weight of raw saccharides charged.

is used alone, the amount is preferably not more than 20 γ/l., not more than 15 γ/l. or not more than 15 γ/l. corresponding to said compounds respectively. Additionally, it is possible to achieve the same outstanding effect as described above by a combination of two or more of the group including desthiobiotin, biotin-d-sulfoxide and biocytin. With the combination of biotin and biocytin, the total amount thereof is preferably not more than 15 γ/l. With the combination of desthiobiotin and biocytin or biotin-d-sulfoxide, the total amount thereof is preferably not more than 18 γ/l.

The L-glutamic-acid producing bacteria belonging to the genus Brevibacterium which may be used in the present invention include *Brevibacterium lactofermentum* ATCC No. 13869, *Brevibacterium saccharolyticum* ATCC No. 14066, *Brevibacterium flavum* ATCC No. 14067, *Brevibacterium immariophilium* ATCC No. 14068 and *Brevibacterium roseum* ATCC No. 13825.

In the fermentation in accordance with the invention, the culture is carried out while maintaining the pH of the culture medium at slightly alkaline conditions by an addition of ammonia or urea. Temperatures and time of culturing will depend upon the bacteria used.

The methods of fermentation which may be used in this invention include fermentation involving shaking or employing submerged culture under aeration. L-glutamic acid produced in the culture medium may be recovered with any conventional techniques, e.g., by filtering the fermented medium to remove the cells, concentrating the filtrate, adjusting the pH to 3.2 by the addition of hydrochloric acid and precipitating L-glutamic acid.

To illustrate the present invention, the following examples are given.

*Example 1*

A culture medium containing glucose 10.39%, $KH_2PO_4$ 0.1%, $MgSO_4 \cdot 7H_2O$ 0.04%, $Fe^{++}$ 2 p.p.m., $Mn^{++}$ 2 p.p.m., hydrolysate of soybean protein (total nitrogen 2.4 g./dl.) 0.1 ml./dl., vitamin $B_1$ hydrochloride 50 $\gamma$/l. and dl-desthiobiotin 7$\gamma$/l. was adjusted to pH of 7.0 and sterilized by steam heating. Then there was added 2% of sterilized urea solution (45 g./dl.) to the culture medium, and the cells of *Brevibacterium lactofermentum* ATCC No. 13869 cultured in non-saccharide bouillon agar medium at 30° C. for 24 hours were inoculated followed by a shaking of the culture at 31° C., the shaking being effected at the rate of 120 $\mu$p.m. and 7 cm. amplitude. During the culturing, the decomposition of urea by urease results in ammonia and the pH was changed to alkalinity. However, the ammonia thus formed was gradually assimilated and consumed, and consequently the pH reaches 7.0 16 hours from the beginning of the culturing. At the end of this time, 2% of urea solution (45 g./dl.) was added and the fermentation was continued for 6 hours further. The pH was again decreased to 7.0 and 3% of urea solution (45 g./dl.) was added. The culturing was completed 40 hours from the beginning thereof. L-glutamic acid in the culture medium thus obtained amounted to 5.23 g./dl. and the yield was 51.3% on the basis of the weight of the raw saccharide charged.

*Example 2*

A culture medium containing glucose 10.2%, $KH_2PO_4$ 0.1%, $MgSO_4 \cdot 7H_2O$ 0.04%, urea 0.8%, $Fe^{++}$ 5 p.p.m., $Mn^{++}$ 5 p.p.m., glycine 80 mg./l., dl-alanine 160 mg./l., L-methionine 80 mg./l., dl-phenylalanine 160 mg./l., L-histidine 80 mg./l., vitamin $B_1$ hydrochloride 100 $\gamma$/l., and dl-desthiobiotin 10$\gamma$/l. was adjusted to a pH of 6.5 and sterilized at high pressure. There was added 4% of sterilized aqueous urea (45 g./dl.) to the medium and the cells of *Brevibacterium saccharolyticum* ATCC No. 14066 cultured in non-saccharide bouillon agar medium at 30° C. for 18 hours were inoculated followed by shaking at 29–30° C. at the rate 125 r.p.m. and 7 cm. of amplitude. The culturing was completed 40 hours from the beginning thereof.

L-glutamic acid in the culture medium thus obtained amounted to 4.68 g./dl. and the yield was 45.8% on the basis of the weight of the raw saccharide charged.

*Example 3*

The culture medium containing glucose 10.4%, $KH_2PO_4$ 0.1%, $MgSO_4 \cdot 7H_2O$ 0.04%, $Fe^{++}$ 2 p.p.m., $Mn^{++}$ 2 p.p.m., hydrolysate of soybean protein (total nitrogen 2.4 g./dl.) 0.1 ml./dl., vitamin $B_1$ hydrochloride 200 $\gamma$/l., and dl-desthiobiotin 10 $\gamma$/l. was sterilized at high pressure. There was added 2% of sterilized aqueous urea (45 g./dl.) to the medium and then the cells of *Brevibacterium flavum* ATCC No. 14067 cultured in non-saccharide bouillon agar at 30° C. for 24 hours were inoculated followed by shaking at 30° C. 2% and 3% of aqueous urea were added at 12 hours and 22 hours from the beginning of the culturing respectively. The culturing was completed 40 hours from the beginning thereof.

L-glutamic acid in the culture medium thus obtained amounted to 5.12 g./dl. and the yield was 49.3% on the basis of the weight of the raw saccharide charged.

*Example 4*

Example 3 was repeated except that *Brevibacterium roseum* ATCC No. 13825 was used, and 2% and 3% of aqueous urea were added to the medium 14 hours and 22 hours from the beginning of the culturing.

L-glutamic acid in the fermented medium thus obtained amounted to 5.18 g./dl. and the yield was 49.8% on the basis of the weight of the raw saccharide charged.

*Example 5*

Example 3 was repeated except that *Brevibacterium immariophilium* ATCC No. 14068 was used, and 2% and 3% of aqueous urea were added to the medium 14 hours and 21 hours from the beginning of the culturing.

L-glutamic acid in the fermented medium thus obtained amounted to 3.03 g./dl. and the yield was 29.1% on the basis of the raw saccharide charged.

*Example 6*

A medium which had a pH of 7.0 and contained glucose 10%, $KH_2PO_4$ 0.1%, $MgSO_4 \cdot 7H_2O$ 0.04%, $Fe^{++}$ 2 p.p.m., $Mn^{++}$ 2 p.p.m., hydrolysate of soybean protein (total nitrogen 2.4 g./dl.) 0.1 ml./dl., vitamin $B_1$ hydrochloride 200 $\gamma$/l., and biotin-d-sulfoxide 8 $\gamma$/l. was sterilized by steam. There was added 2% of aqueous urea (45 g./dl.) to the medium and the cells of *Brevibacterium lactofermentum* ATCC No. 13869 cultured in bouillon agar for 24 hours were inoculated followed by shaking at 31° C. for 40 hours. During the culturing, the pH was raised to about 9.0 and then decreased to 7.0. 2% of aqueous urea and then 3% of aqueous urea were added.

L-glutamic acid in the fermented medium thus formed was 4.63 g./dl. and the yield was 46.3% on the basis of the raw saccharide charged.

*Example 7*

Example 6 was repeated except that *Brevibacterium saccharolyticum* ATCC No. 14066 was used and the concentration of biotin-d-sulfoxide was 12 $\gamma$/l.

L-glutamic acid in the fermented medium thus obtained amounted to 4.21 g./dl., and the yield was 42.1% on the basis of the weight of the raw saccharide charged.

*Example 8*

Example 6 was repeated except that *Brevibacterium flavum* ATCC No. 14067 was used and the concentration of biotin-d-sulfoxide was 6 $\gamma$/l.

L-glutamic acid in the fermented medium thus obtained amounted to 5.19 g./l., and the yield was 51.9% on the basis of the weight of the raw saccharide charged.

*Example 9*

Example 6 was repeated except that *Brevibacterium roseum* ATCC No. 13825 was used, and the concentration of biotin-d-sulfoxide was 5 $\gamma$/l.

L-glutamic acid in the fermented medium thus obtained amounted to 4.61 g./dl., and the yield was 46.1% on the basis of the weight of the raw saccharide charged.

*Example 10*

Example 6 was repeated except that *Brevibacterium immariophilium* ATCC No. 14068 was used, the concentration of biotin-d-sulfoxide was 6 $\gamma$/l., and 2% and 3% of aqueous urea were added 13 hours and 18 hours from the beginning of the culturing.

L-glutamic acid in the fermented medium thus obtained amounted to 2.43 g./dl., and the yield was 24.3% on the basis of the weight of the raw saccharide charged.

*Example 11*

Example 6 was repeated except that 6 $\gamma$/l. of biocytin was used in lieu of 8 $\gamma$/l. of biotin-d-sulfoxide.

L-glutamic acid in the fermented medium thus obtained was 4.23 g./dl., and the yield was 42.3% based on the weight of the raw saccharide charged.

*Example 12*

Example 7 was repeated except that 16 γ/l. of biocytin was used in lieu of biotin-d-sulfoxide.

L-glutamic acid in the fermented medium thus obtained was 3.6 g./dl., and the yield was 36% based on the weight of the raw saccharide charged.

*Example 13*

Example 8 was repeated except that 8 γ/l. of biocytin was used in lieu of biotin-d-sulfoxide.

L-glutamic acid in the fermented medium thus obtained amounted to 4.86 g./dl., and the yield was 48.6% based on the weight of the saccharide charged.

*Example 14*

Example 9 was repeated except that 6 γ/l. of biocytin was used in lieu of biotin-d-sulfoxide.

L-glutamic acid in the fermented medium thus obtained amounted to 4.85 g./dl., and the yield was 48.5% based on the weight of the raw saccharide charged.

*Example 15*

Example 10 was repeated except that 6 γ/l. of biocytin was used in lieu of biotin-d-sulfoxide, and 2% and 3% of aqueous urea were added 14 hours and 23 hours later respectively.

L-glutamic acid in the fermented medium thus obtained amounted to 2.99 g./dl., and the yield was 29.9% based on the weight of the raw saccharide charged.

We claim:

1. In a process for producing L-glutamic acid which comprises culturing L-glutamic acid producing bacteria belonging to the genus Brevibacterium under aerobic conditions in a culture medium containing carbohydrates, nitrogen sources, amino acids, and inorganic salts to produce and accumulate L-glutamic acid in said medium, the improvement comprising culturing the said bacteria under aerobic conditions in said medium in the presence of at least one member selected from the group consisting of desthiobiotin, biotin-d-sulfoxide and biocytin, and recovering L-glutamic acid thus formed.

2. Process according to claim 1 wherein the said L-glutamic-acid producing bacterium is *Brevibacterium lactofermentum*.

3. Process according to claim 1 wherein the said L-glutamic-acid producing bacterium is *Brevibacterium saccharolyticum*.

4. Process according to claim 1 wherein the said L-glutamic-acid producing bacterium is *Brevibacterium flavum*.

5. Process according to claim 1 wherein the said L-glutamic-acid producing bacterium is *Brevibacterium roseum*.

6. Process according to claim 1 wherein the said L-glutamic-acid producing bacterium is *Brevibacterium immariophilium*.

7. Process according to claim 1 wherein the said culture medium contains 3–20 γ/l. of desthiobiotin.

8. Process according to claim 1 wherein the said culture medium contains 2–15 γ/l. of biotin-d-sulfoxide.

9. Process according to claim 1 wherein the said culture medium contains 2–15 γ/l. of biocytin.

10. Process according to claim 1 wherein the culture medium includes a total amount of desthiobiotin and biotin-d-sulfoxide of 3–18 γ/l.

11. Process according to claim 1 wherein the culture medium includes a total amount of desthiobiotin and biocytin of 3–18 γ/l.

12. Process according to claim 1 wherein the culture medium includes a total amount of biotin-d-sulfoxide and biocytin of 2–15 γ/l.

13. Process according to claim 1 wherein the culture medium includes a total amount of desthiobiotin, biotin-d-sulfoxide and biocytin of 1–18 γ/l.

References Cited in the file of this patent

UNITED STATES PATENTS 3,002,889      Kinoshita et al.  ---------- Oct. 3, 1961

OTHER REFERENCES

"Vitaminology," Eddy, 1949, pp. 226–241, QP801V5E4V, Williams & Wilkens Co., Baltimore, Md.

Archives of Biochemistry and Biophysics, vol. 77, 378–386, 1958, QP501A77.

Biological Abstracts, vol. 31, 1957, par. 25,916.

The Vitamins, vol. k, chapter 4 (1954), Academic Press, Inc., New York, QP801V5533.